(12) United States Patent
Bast et al.

(10) Patent No.: US 7,229,254 B2
(45) Date of Patent: Jun. 12, 2007

(54) TURBINE BLADE WITH A REDUCED MASS

(75) Inventors: Ulrich Bast, Munich (DE); Wolfgang Hermann, Mülheim (DE)

(73) Assignee: Siemens Aktiengesellschaft, Munich (DE)

( * ) Notice: Subject to any disclaimer, the term of this patent is extended or adjusted under 35 U.S.C. 154(b) by 190 days.

(21) Appl. No.: 10/501,723

(22) PCT Filed: Dec. 18, 2002

(86) PCT No.: PCT/EP02/14499

§ 371 (c)(1),
(2), (4) Date: Jul. 15, 2004

(87) PCT Pub. No.: WO03/060292

PCT Pub. Date: Jul. 24, 2003

(65) Prior Publication Data

US 2005/0069411 A1    Mar. 31, 2005

(30) Foreign Application Priority Data

Jan. 18, 2002   (JP) ................................. 02001348

(51) Int. Cl.
F01D 5/14   (2006.01)
(52) U.S. Cl. ............................... 416/229 A; 416/241 B
(58) Field of Classification Search ............ 416/229 A, 416/229 R, 241 B, 241 R, 214 B
See application file for complete search history.

(56) References Cited

U.S. PATENT DOCUMENTS

| | | | |
|---|---|---|---|
| 3,992,127 A | 11/1976 | Booher, Jr. et al. | |
| 4,063,955 A * | 12/1977 | Fritsch et al. | 501/9 |
| 4,111,603 A * | 9/1978 | Stahl | 416/95 |
| 4,247,259 A | 1/1981 | Saboe et al. | |
| 4,285,634 A | 8/1981 | Rossman et al. | |
| 4,324,843 A * | 4/1982 | Brennan et al. | 428/697 |
| 4,563,128 A | 1/1986 | Rossmann | |
| 4,876,849 A * | 10/1989 | Klingels | 60/792 |
| 5,403,153 A | 4/1995 | Goetze | |
| 5,720,597 A * | 2/1998 | Wang et al. | 416/229 A |
| 5,743,713 A | 4/1998 | Hattori et al. | |
| 6,206,634 B1 * | 3/2001 | Doi et al. | 415/200 |
| 6,280,550 B1 * | 8/2001 | Steibel et al. | 156/182 |
| 6,514,046 B1 * | 2/2003 | Morrison et al. | 416/229 A |

(Continued)

FOREIGN PATENT DOCUMENTS

EP    0 980 961 A1    2/2000

(Continued)

OTHER PUBLICATIONS

Department of Defense Composite Materials Handbook vol. 5 Ceramic Matrix Composites, p. 63 and 227.*

*Primary Examiner*—Thomas Denion
*Assistant Examiner*—Devin Hanan

(57) ABSTRACT

The invention relates to a turbine comprising at least four stages and to the use of a rotor blade with a reduced mass. In prior art, rotor blades in the fourth stage of a gas turbine, which exceed 50 cm in length, cause problems relating to mechanical strength, as centrifugal forces of too great a magnitude occur during the rotation of the rotor blades. An inventive rotor blade in the fourth row of a gas turbine has a reduced density as a result of a high proportion of a ceramic, thus reducing the centrifugal force.

22 Claims, 2 Drawing Sheets

U.S. PATENT DOCUMENTS 6,756,131 B2 * 6/2004 Oguma et al. .............. 428/632

FOREIGN PATENT DOCUMENTS

| FR | 999820 | 2/1952 |
| FR | 57426 | 1/1953 |
| GB | 993412 | 5/1965 |
| GB | 2 027 496 A | 2/1980 |

* cited by examiner

TURBINE BLADE WITH A REDUCED MASS

CROSS REFERENCE TO RELATED APPLICATIONS

This application is the US National Stage of International Application No. PCT/EP02/14499, filed Dec. 18, 2002 and claims the benefit thereof. The International Application claims the benefits of European Patent application No. 02001348.8 EP filed Jan. 18, 2002, both of the applications are incorporated by reference herein in their entirety.

BACKGROUND OF THE INVENTION

Field of the Invention

The invention relates to a turbine with at least four stages in accordance with claim 1 and to the use of a turbine blade with a reduced density in accordance with claim 9.

The use of ceramic guide vanes in gas turbines is known from U.S. Pat. No. 3,992,127. Ceramic guide vanes are used because the ceramic has good high-temperature properties. Particularly high temperatures, which only ceramics are able to withstand, occur in particular in the first row downstream of the combustion chamber (first turbine stage), with the turbine blades and vanes in the first row being the smallest.

U.S. Pat. No. 5,743,713 has disclosed a ceramic blade which is inserted into a metallic rotor disk of a turbine.

U.S. Pat. No. 4,563,128 has disclosed a ceramic blade which has a metallic core surrounded on the outside by ceramic and extending as far as a radial end of the blade. The metallic core forms a very high proportion of the volume.

Hitherto, ceramic rotor blades have only been used, by virtue of their high thermal stability, in the temperature-critical stage or stages of a turbine, whereas in the subsequent stages it has been customary to use metallic rotor blades (in particular made from Ni-based alloys or from TiAl alloys).

A significant improvement to the efficiency of gas turbines can be achieved if, at least from the fourth stage onward, the turbine rotor blades are increased in size by, for example, approximately 20% compared to conventional dimensions. This increase in size from the fourth stage onward, however, leads to a considerable increase in the centrifugal forces at the blades if the rotational speed remains unchanged, and these forces represent unacceptable loads on these blades and on the disks to which the blades are secured.

SUMMARY OF THE INVENTION

Therefore, it an object of the invention to provide a turbine with an increased efficiency compared to a turbine with conventional blading.

The object is achieved by virtue of the fact that the turbine, in the fourth stage, in each case has rotor blades with a length of at least 50 cm which contain a high proportion of a material with a density of at most 4 g/cm$^3$, and are, for example, made from ceramic, with the result that the mass is significantly reduced compared to standard metallic blading of conventional dimensions. This allows the blade length, or at least the length of the main blade section, to be lengthened considerably compared to metallic blades.

It is even possible to use solid-ceramic or hollow-ceramic blades which are secured to metallic disks of the turbine rotor, as is known from U.S. Pat. No. 5,743,713.

It is also advantageous to use ceramic rotor blades which have a metallic core which is surrounded by ceramic. In this case, the proportion by volume of the ceramic is very high, so that the mass is greatly reduced compared to a purely metallic blade with an optional thin ceramic protective layer.

A further advantage of a more lightweight blade is that the mechanical loading on the disk to which the blade is secured is lower during rotation on account of the lower mass attached thereto.

BRIEF DESCRIPTION OF THE DRAWINGS

The figures diagrammatically depict the invention, which is explained in more detail below with further details and advantageous refinements.

In the drawing.

DETAILED DESCRIPTION OF THE INVENTION

Figure 1:
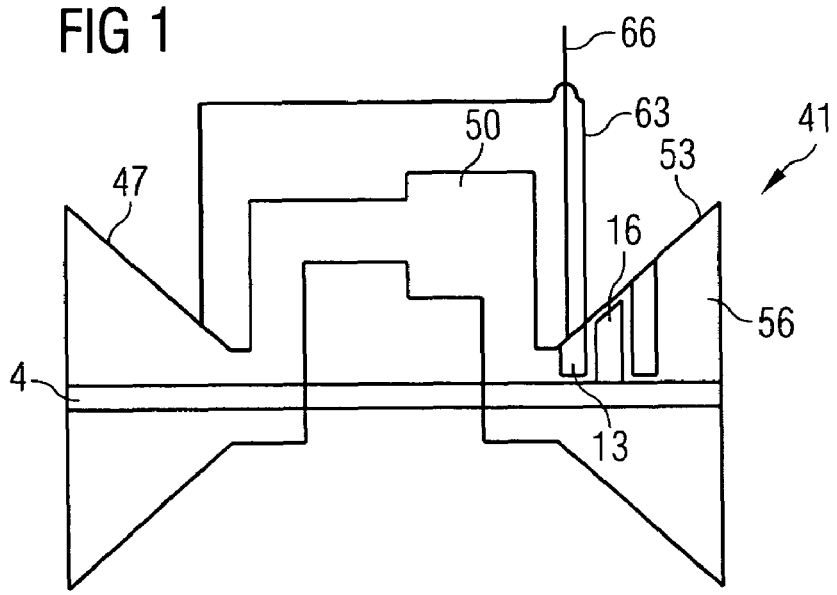
FIG. 1 shows a gas turbine.

FIG. 1 diagrammatically depicts a longitudinal section through a turbine, for example a gas turbine 41. However, the invention is not restricted to a gas turbine.

A compressor 47, a combustion chamber 50 and a turbine part 53 are arranged in succession along a turbine shaft which includes a tie rod 4. The turbine part 53 has a hot-gas duct 56. Gas turbine blades and vanes 13, 16 are arranged in the hot-gas duct 56. Rings of guide vanes and rings of rotor blades are provided alternately. The gas turbine blades and vanes 13, 16 are cooled, for example, by combined air and/or steam cooling. For this purpose, by way of example, compressor air is removed from the compressor 47 and fed to the gas turbine blades and vanes 13, 16 via an air passage 63. Steam is also fed to the gas turbine blades and vane 13, 16 via a steam feed 66, for example. This steam preferably originates from a steam turbine of a combined-cycle gas and steam process.

Figure 2:
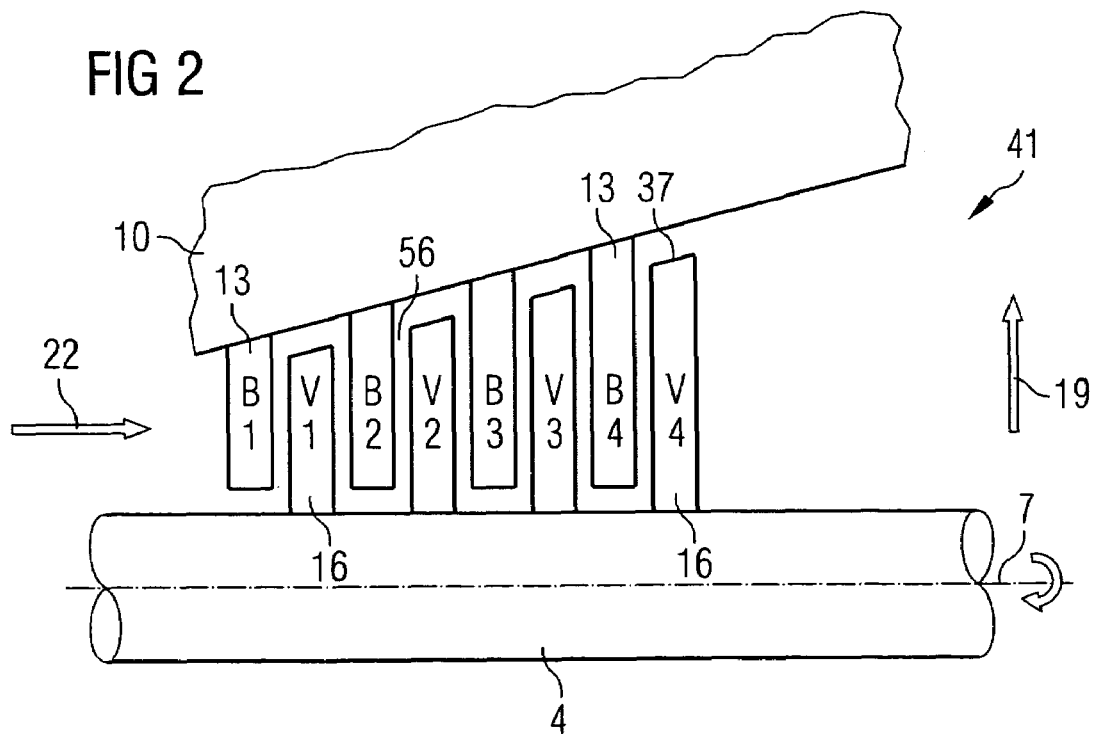
FIG. 2 shows a partial region of a gas turbine with a fourth rotor blade stage.

FIG. 2 shows an excerpt from a gas turbine 41. The gas turbine 41 has a turbine shaft with a tie rod 4 which rotates about an axis 7. A plurality of guide vanes 13 and a plurality of rotor blades 16, which are arranged, for example, in the hot-gas duct 56, extend in the radial direction 19, which runs perpendicular to the axis 7. There are at least four rows of rotor blades and, for example, four rows of guide vanes, i.e. there is a total of four stages. The first row of guide vanes may, for example, may be replaced by a special burner arrangement. Just one of the blades 16 in the fourth stage is illustrated here, by way of example.

The rotor blades 16 are, for example, secured to metal disks (25, FIG. 3) on the turbine shaft, held together by the tie rod 4, and rotate with the tie rod 4 about the axis 7.

The guide vanes 13 are secured in a rotationally fixed position to a casing 10 of the gas turbine 41.

A hot gas 22 flows in the direction of the axis 7, from the left to the right in the drawing, as is diagrammatically indicated by an arrow.

The fourth row of rotor blades, as seen in the direction of flow 22, is denoted by V4. The rotor blades in the fourth stage are in each case rotor blades 16 which have a high proportion by volume of their material made up of a material with a density of at most 4 g/cm³ and are made, for example, from ceramic and have a length of at least 50 cm, in particular of at least 65 cm.

Since the density of ceramic materials is in the range from 1.5 to 3.5 g/cm³, and is therefore well below the densities of nickel-base alloys, at 8 g/cm³, and of TiAl alloys, at approximately 4.5 g/cm³, a ceramic rotor blade of this type has a considerable reduction in mass compared to a corresponding metallic rotor blade, so that, when these rotor blades are rotating, lower centrifugal forces occur, in particular at the outer radial end 37 of the rotor blade 16, thereby inducing loading in particular on the root of the rotor blade 16 and its anchoring in the turbine shaft.

By lengthening the turbine rotor blades in the fourth row by, for example, approximately 20%, it is possible to considerably increase the efficiency of gas turbines. Ceramic rotor blades are, for example, made completely from ceramic, in which case the ceramic may advantageously comprise various layers of ceramics. For example, it is possible to use fiber-reinforced CMC oxide ceramics or fiber-reinforced CMC nonoxide ceramics, nonoxidic ceramics, such as for example carbon fibers or SiC fibers in a corresponding carbon or silicon carbide matrix. It is also possible to use oxide systems, e.g. mullite fibers or aluminum oxide fibers in a mullite matrix.

The ceramics may in turn be coated with a protective layer 36 (FIG. 4a) to prevent corrosion and oxidation, such as those which are known from metallic turbine blades: yttrium-stabilized zirconia, boron nitride, spinels.

Figure 3:
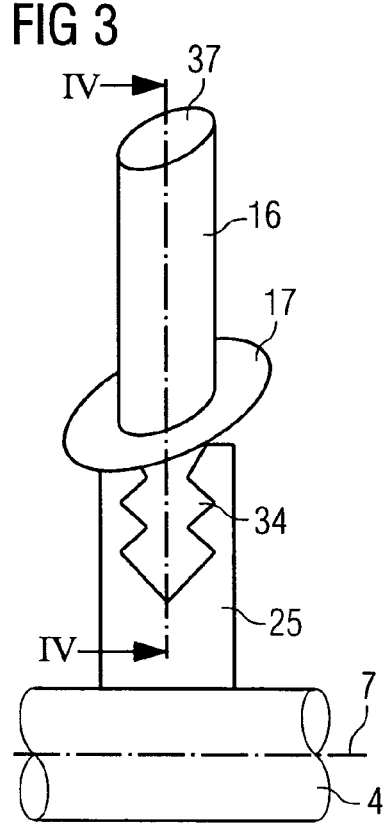
FIG. 3 shows a rotor blade and a rotor disk.

FIG. 3 shows a rotor blade 16 with a length L between platform 17 and radial end of the rotor blade 16 which is formed, for example, entirely from ceramic and is inserted into a metallic rotor disk 25 in a manner fixed in terms of rotation. The metallic disk 25 is connected to the tie rod 4 and rotates therewith.

The diameter of the disk 25 is no greater than usual and is also not exposed to the highest temperatures within the hot-gas duct 56, and consequently metal can continue to be used as material for the disk 25, in the same way as in a conventional turbine.

It is also possible to use what are known as hybrid turbine blades, which still have a metallic core but this core is surrounded by a ceramic, as is known, for example, from U.S. Pat. No. 4,563,128. The content of disclosure of this document relating to the structure of the ceramic turbine blade is expressly incorporated in the content of disclosure of the present application. Further types of hybrid blades are conceivable.

Figure 4:
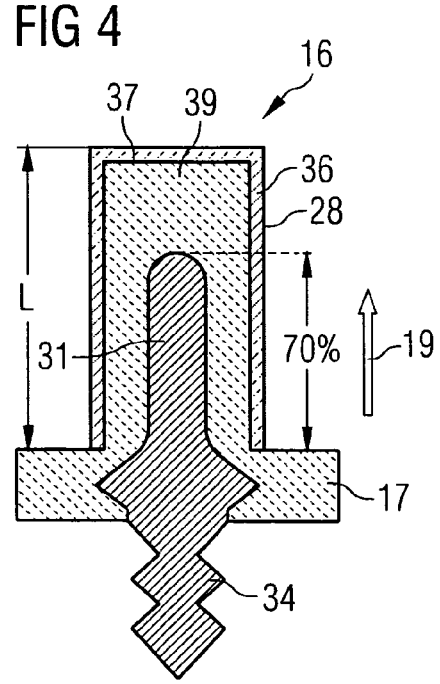
FIG. 4 shows a section on line IV-IV in FIG. 3.

FIG. 4 shows an example of a hybrid blade 16. A main blade section 28 at its outer surface consists of ceramic 39. In the interior, there is a metallic core 31, for example formed from a nickel and/or cobalt superalloy. The metallic core 31, by way of example, also forms a root part 34 of the blade 16.

In the radial direction 19, the metallic core 31 does not extend all the way to the radial end 37 of the blade 16, but rather, for example, only extends over for example 70% of the length of the main blade section 28 in the radial direction 19, since otherwise the loads caused by the centrifugal forces at the intended rotational speed of the turbine would exceed the mechanical strength of the metallic core or of the blade root or of the anchoring in the turbine shaft.

The metallic core 31 may at least in part be formed from metallic foam, in order to save further weight.

The proportion by volume of the material formed by the ceramic is amounts to least 40% or, for example, even exceeds that of the metallic core 31, so that the blade 16 has a high proportion by volume of its material formed by ceramic.

Figure 5A:
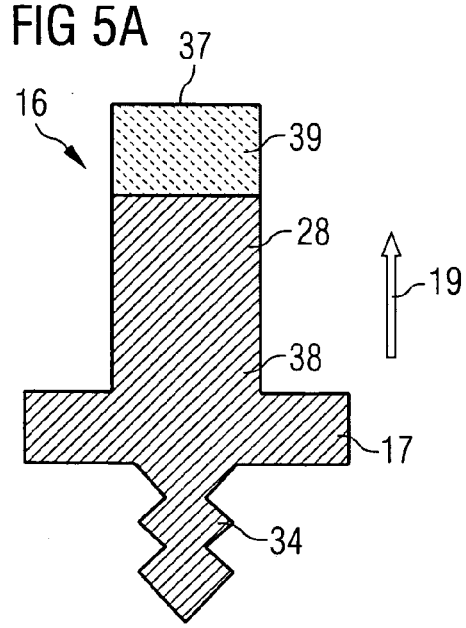
FIG. 5a, b show further exemplary embodiments of a rotor blade.

The proportion of ceramic 39 may also be located predominantly at the end 37 of the blade 16, since that is where the centrifugal forces are highest (FIG. 5a).

A remaining part 38 of the blade 16 consists of metal, for example of a nickel and/or cobalt superalloy. The hybrid blade 16 may also be of internally hollow design, in order to further reduce its weight.

Figure 5B:
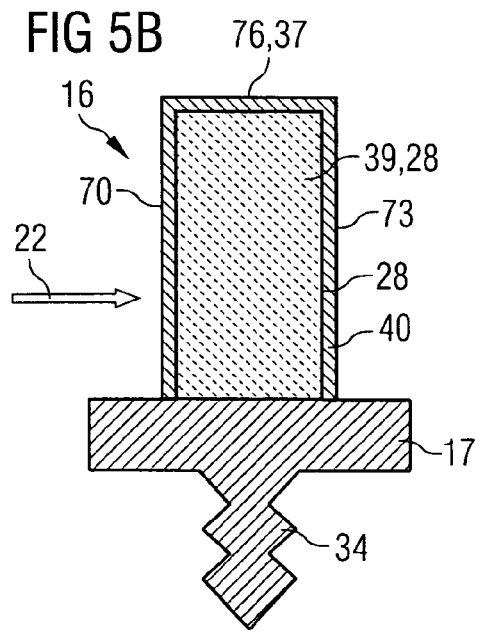

It is also possible, as illustrated in FIG. 5b, to provide a skeleton 40 made from metal, for example from a nickel and/or cobalt superalloy, into which ceramic parts are introduced.

The skeleton 40 comprises, for example, a leading edge 70, which the medium strikes first in the direction of flow, a trailing edge 73, the root part 34 and the tip 76, as well as the radial end 37.

The rotor blade 16 may also be internally hollow and cooled by air and/or steam cooling with or without film-cooling bores.

It has not hitherto been known that ceramic rotor blades with a length that is considerably increased compared to conventional dimensioning, on account of their lower density and the associated reduction in the centrifugal forces, can advantageously be used to increase the turbine efficiency.

What is claimed is:

1. A gas turbine blade for a fourth stage and onward of a multi-stage turbine, the blade comprising:
    a metallic root portion;
    a platform portion; and
    an airfoil portion comprising at least a structural ceramic material for bearing a tensile load to oppose a centrifugal force that develops during rotation of the blade, wherein the root, platform and airfoil are collectively comprised of a plurality of materials in which at least 40% by volume of the materials comprise the structural ceramic material having a density of at most 4 g/cm³, wherein the density by volume provided by the plurality of materials allows providing a length of at least 50 cm for a blade disposed in the fourth stage and onward of the multi-stage turbine.

2. The turbine blade as claimed in claim 1, wherein the turbine blade is arranged in a metallic rotor disk.

3. The turbine blade as claimed in claim 1, wherein the turbine blade has a structural metallic core surrounded by a structural ceramic material.

4. The turbine blade as claimed in claim 3, wherein the metallic core is formed at least in part from a metallic foam.

5. The turbine blade as claimed in claim 1, wherein the ceramic material has a non structural ceramic protective layer arranged over the ceramic material.

6. The turbine blade as claimed in claim 2, wherein the length of the turbine blade is at least 65 cm.

7. The turbine blade as claimed in claim 1, wherein the turbine blade has a metallic skeleton material that functions as a structural frame and is adapted to support a structural ceramic material.

8. The turbine blade as claimed in claim 1, wherein the materials are a ceramic material or a glass material.

9. The turbine blade as claimed in claim 1, wherein the material with the density of at most 4 g/cm³ is a carbon-containing material.

10. A turbine blade for a fourth stage and onward of a multi-stage turbine, the blade comprising:
    a root portion connected to a rotor disk;

an airfoil having a first section located adjacent to the root portion, wherein the first section comprises a material having a first density, the airfoil having a second section located adjacent to the first section consisting exclusively of an structural ceramic material having a second density different than the first density and extending at least 80% of the length of the tip portion, wherein the structural ceramic material bears a tensile load to oppose a centrifugal force that develops during rotation of the blade, wherein at least 40% by volume of the first and second sections comprise the structural ceramic material having a density of at most 4 $g/cm^3$, wherein the density by volume achieved over the first and second sections of the airfoil allows providing a length of at least 50 cm for a blade disposed in the fourth stage and onward of the multi-stage turbine.

11. A gas turbine blade for a fourth stage and onward of a multi-stage turbine, the blade comprised of at least one material in which at least 40% by volume of the material has a density of at most 4 $g/cm^3$, wherein the density by volume achieved by the at least one material allows providing a length of at least 50 cm for a blade disposed in the fourth stage and onward of the multi-stage turbine, wherein the at least one material bears a tensile load to oppose a centrifugal force that develops during rotation of the blade.

12. The turbine blade as claimed in claim 11, wherein the turbine blade has a metallic skeleton into which ceramic parts are introduced.

13. The turbine blade as claimed in claim 11, wherein the material with the density of at most 4 $g/cm^3$ is a ceramic material or a glass material.

14. The turbine blade as claimed in claim 11, wherein the material with the density of at most 4 $g/cm^3$ is a carbon-containing material.

15. The turbine blade as claimed in claim 11, wherein the turbine blade has a metallic core surrounded by a ceramic material, the metallic core and ceramic material both adapted to provide structural support.

16. The turbine blade as claimed in claim 15, wherein the metallic core is formed at least in part from a metallic foam.

17. The turbine blade as claimed in claim 11, wherein the ceramic material has a protective layer.

18. A gas turbine blade for a fourth stage and onward of a multi-stage turbine, the blade comprising:

a metallic root; and a platform comprising a structural ceramic material mechanically interlocked with the root, the platform ceramic material extending radially to form an airfoil, wherein the ceramic material bears a tensile load to oppose a centrifugal force that develops during rotation of the blade.

19. The turbine blade of claim 18 wherein the metallic root comprises one or more affixing ribs at a first portion in correspondence with the platform for establishing the mechanical interlocking with the platform.

20. The turbine blade of claim 19 wherein the metallic root further comprises a second portion extending radially through a portion of the airfoil.

21. The turbine blade of claim 20 wherein the structural ceramic material comprises a volume of at least 40% of the airfoil volume, including the metallic root second portion therein, thereby reducing blade weight to provide a length of at least 50 cm for a blade disposed in the fourth stage and onward of the multi-stage turbine.

22. A gas turbine comprising at least four stages of successively arranged turbine blades and vanes, wherein each stage comprises a row of rotor blades and a row of guide vanes, with the rotor blades having a metallic root part, wherein at least the fourth row of rotor blades comprises rotor blades in which at least 40% by volume of the material has a density of at most 4 $g/cm^3$, so that the mass is substantially reduced compared to a metallic rotor blade, wherein a minimum length of the rotor blades is 50 cm and further wherein at least beyond 80% of the length of a main blade section in a radial direction consists exclusively of ceramic.

* * * * *